Sept. 16, 1969

H. E. TEMPLE 3,466,839

BAKERY PRODUCT HANDLING SYSTEM

Filed July 27, 1966

INVENTOR.
HIRAM E. TEMPLE

BY
Learman, Learman & McCulloch
ATTORNEYS

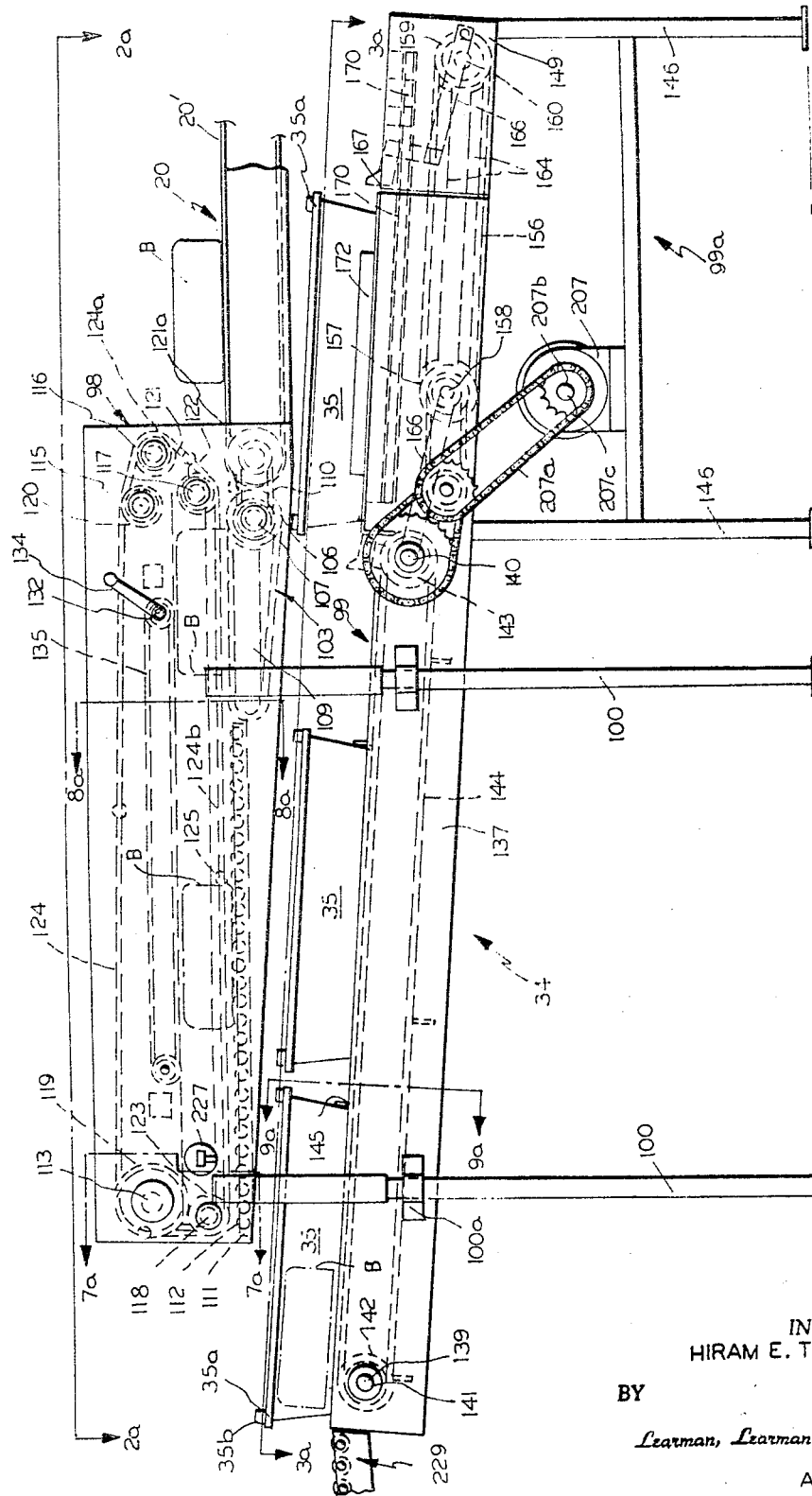

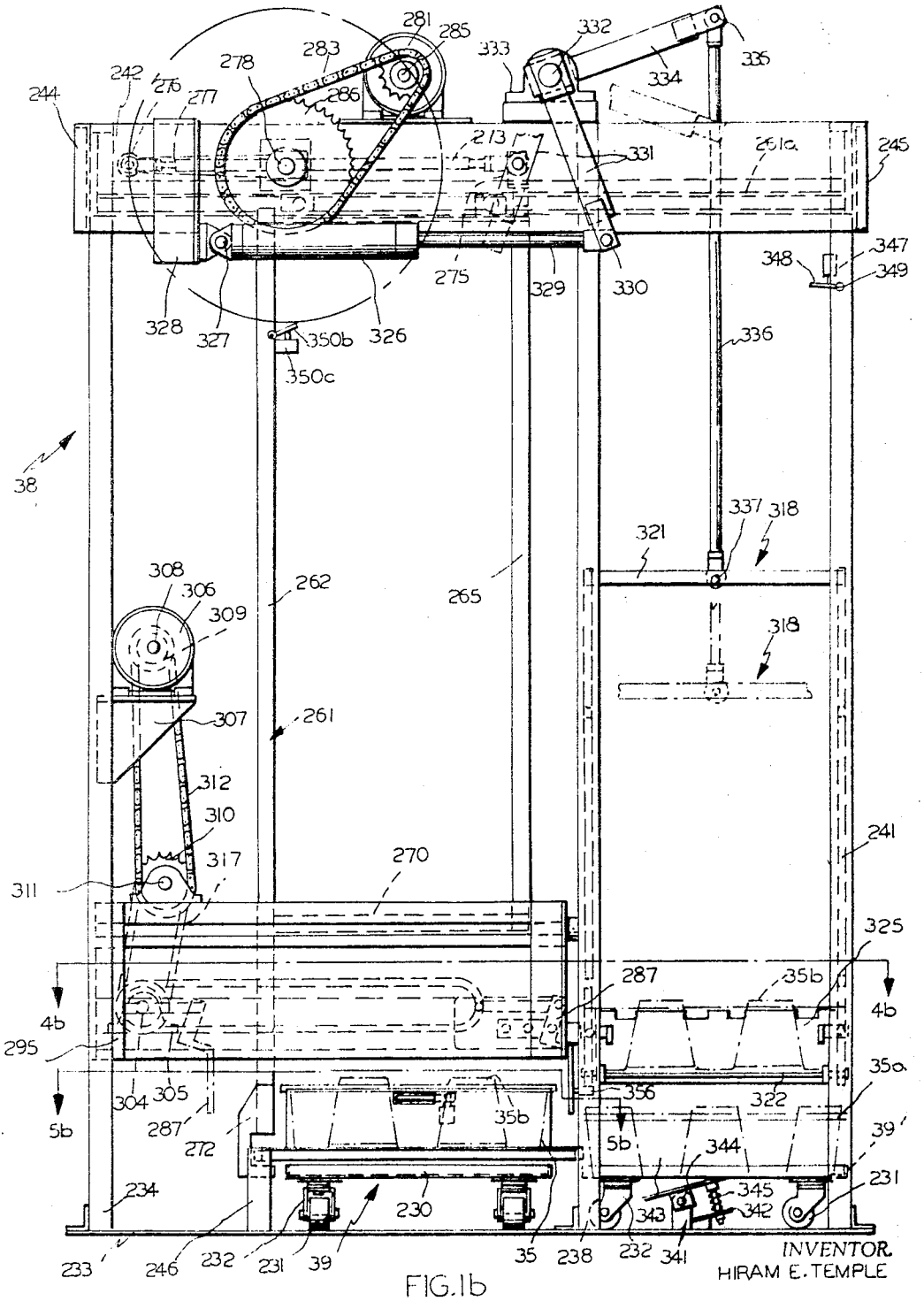

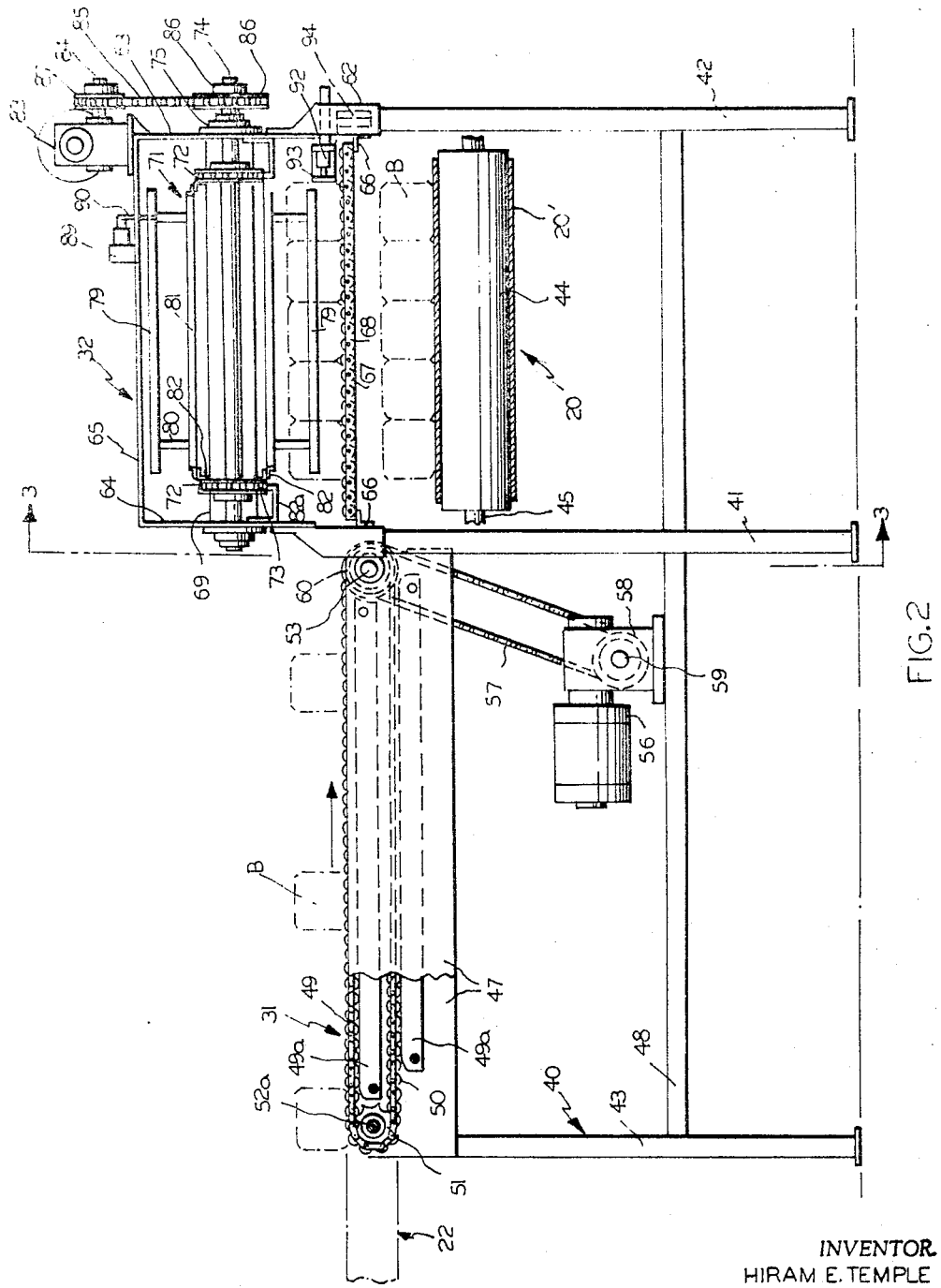

Sept. 16, 1969        H. E. TEMPLE        3,466,839
BAKERY PRODUCT HANDLING SYSTEM
Filed July 27, 1966        15 Sheets-Sheet 5
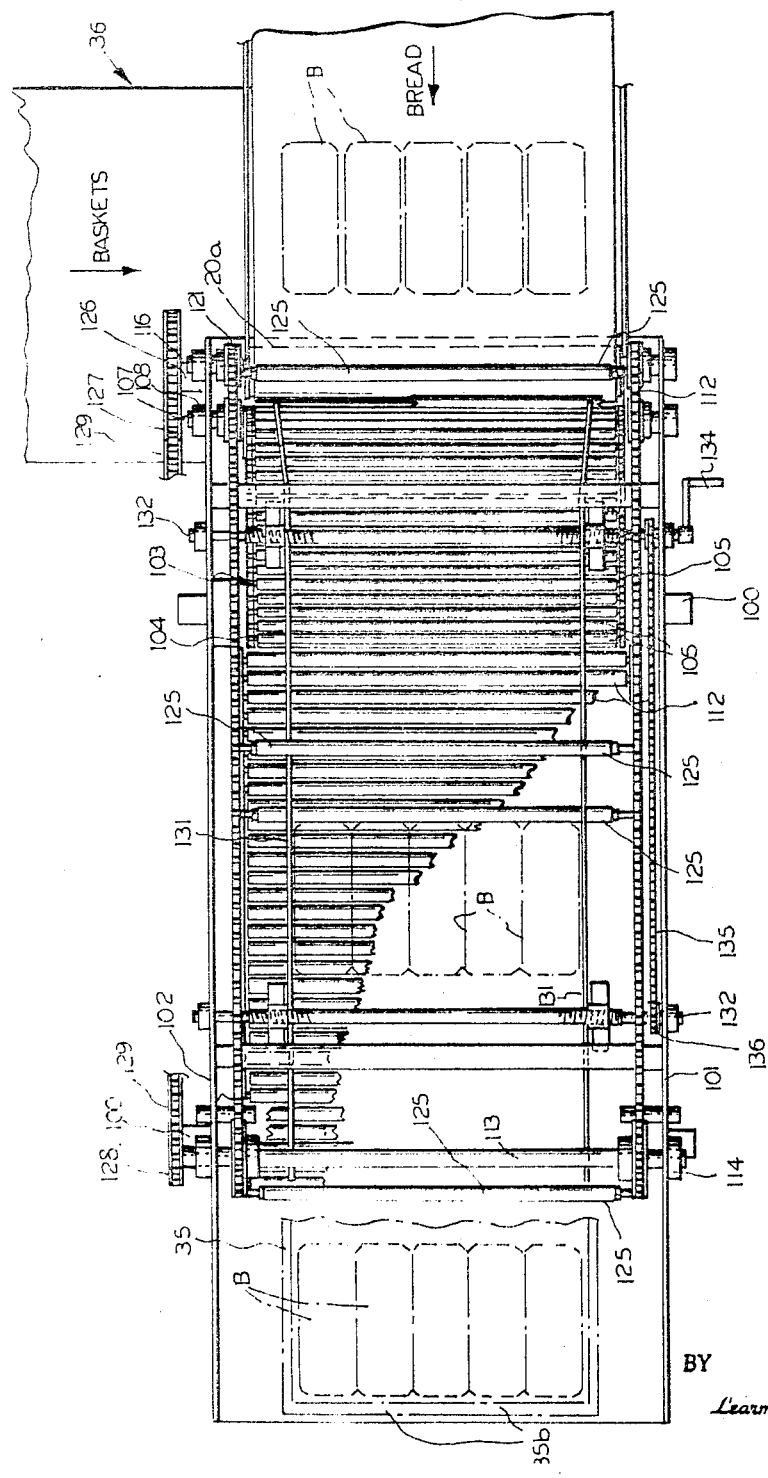
INVENTOR.
HIRAM E. TEMPLE
BY
*Learman, Learman & McCulloch*
ATTORNEYS

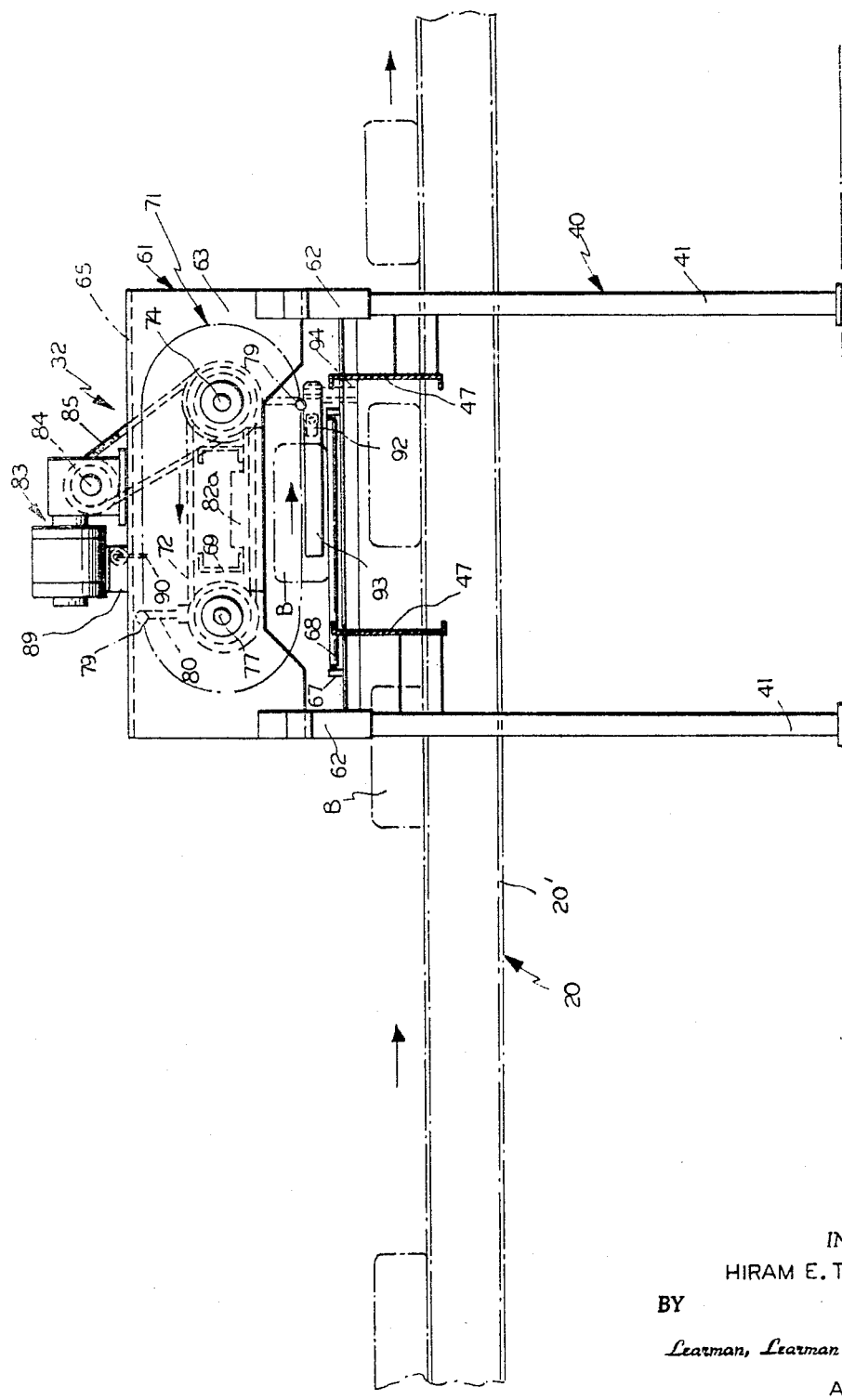

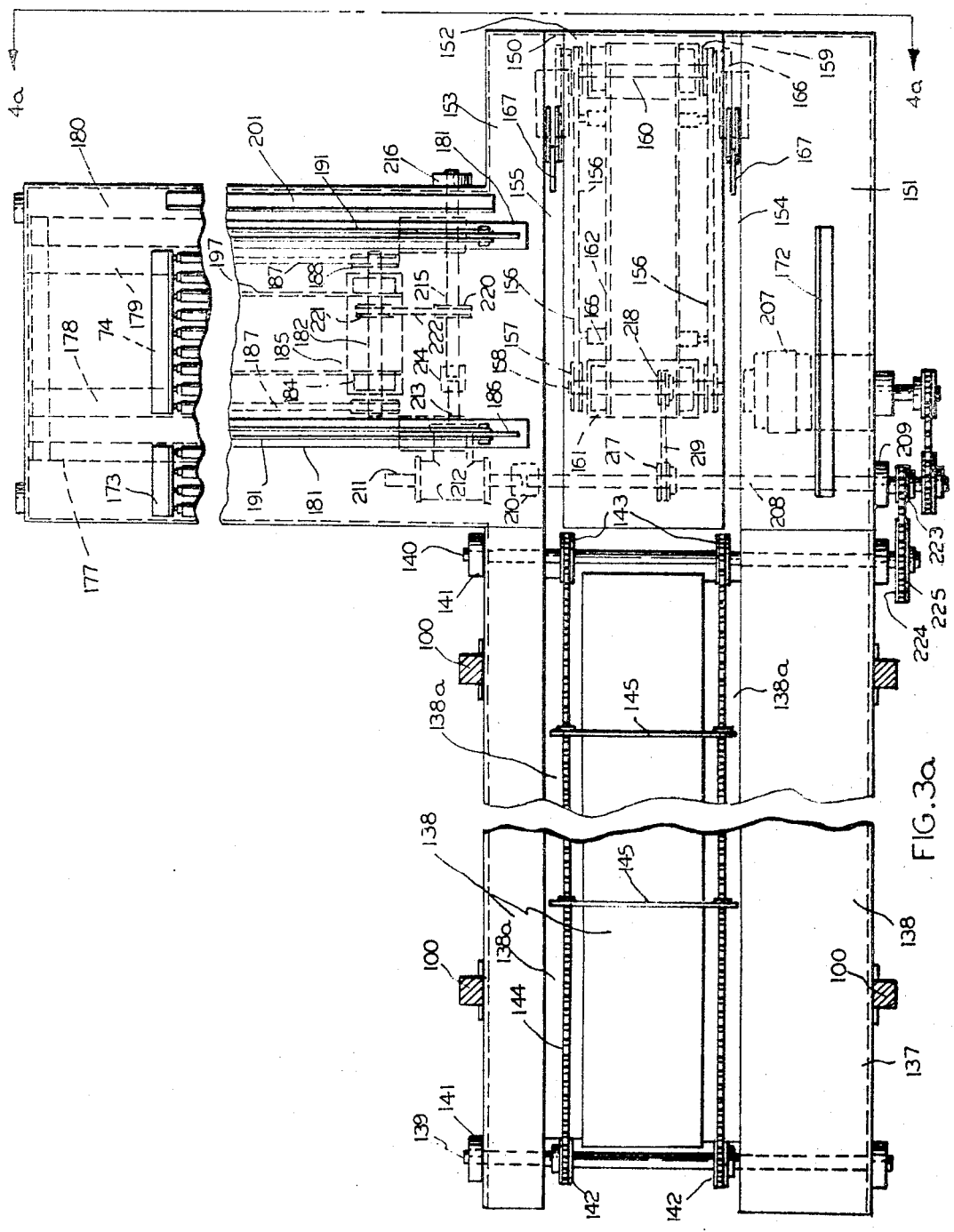

Sept. 16, 1969         H. E. TEMPLE         3,466,839
BAKERY PRODUCT HANDLING SYSTEM
Filed July 27, 1966         15 Sheets-Sheet 9

INVENTOR
HIRAM E. TEMPLE
BY
Learman, Learman & McCulloch
ATTORNEYS

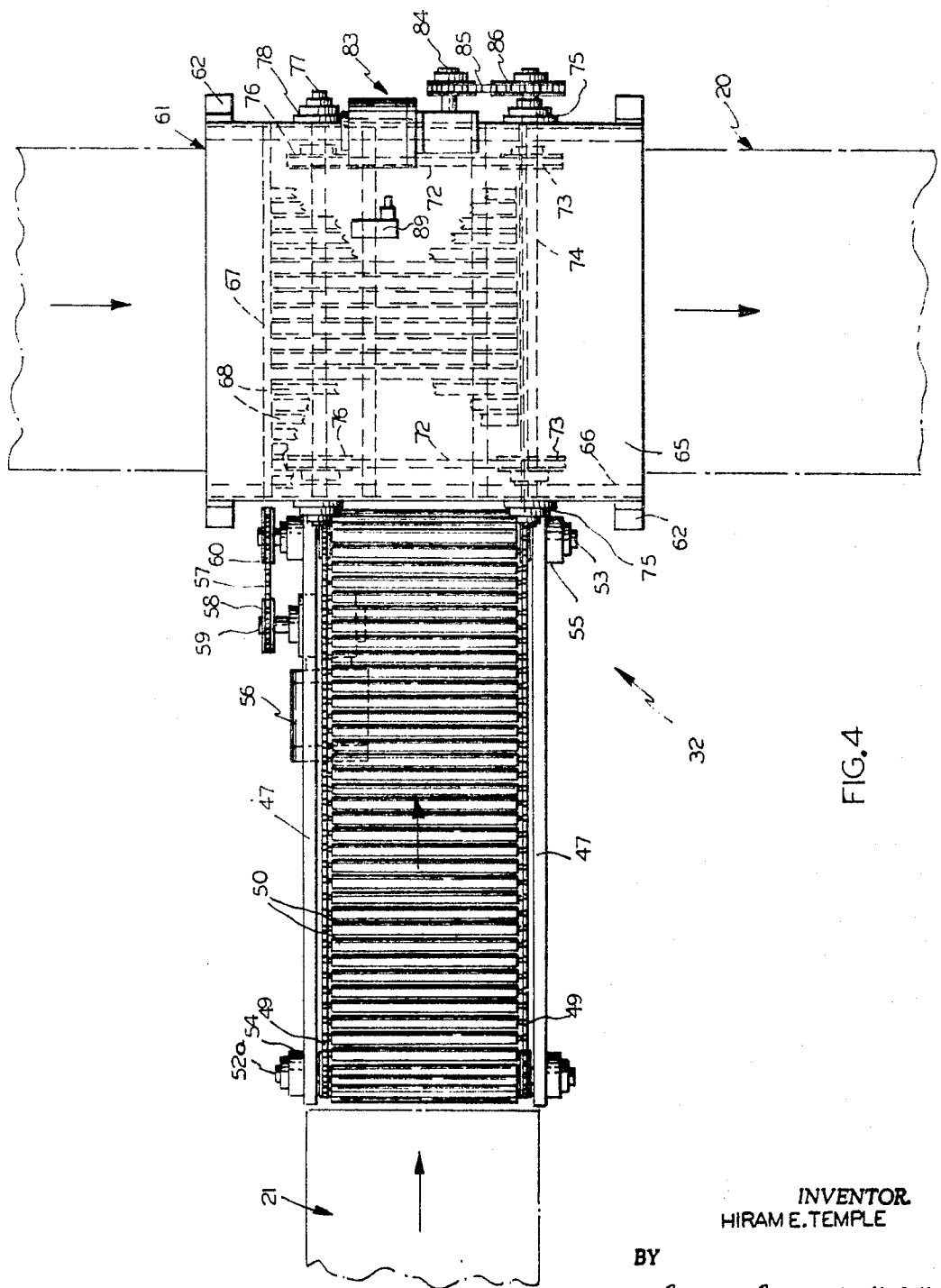

Sept. 16, 1969     H. E. TEMPLE     3,466,839
BAKERY PRODUCT HANDLING SYSTEM
Filed July 27, 1966     15 Sheets-Sheet 11
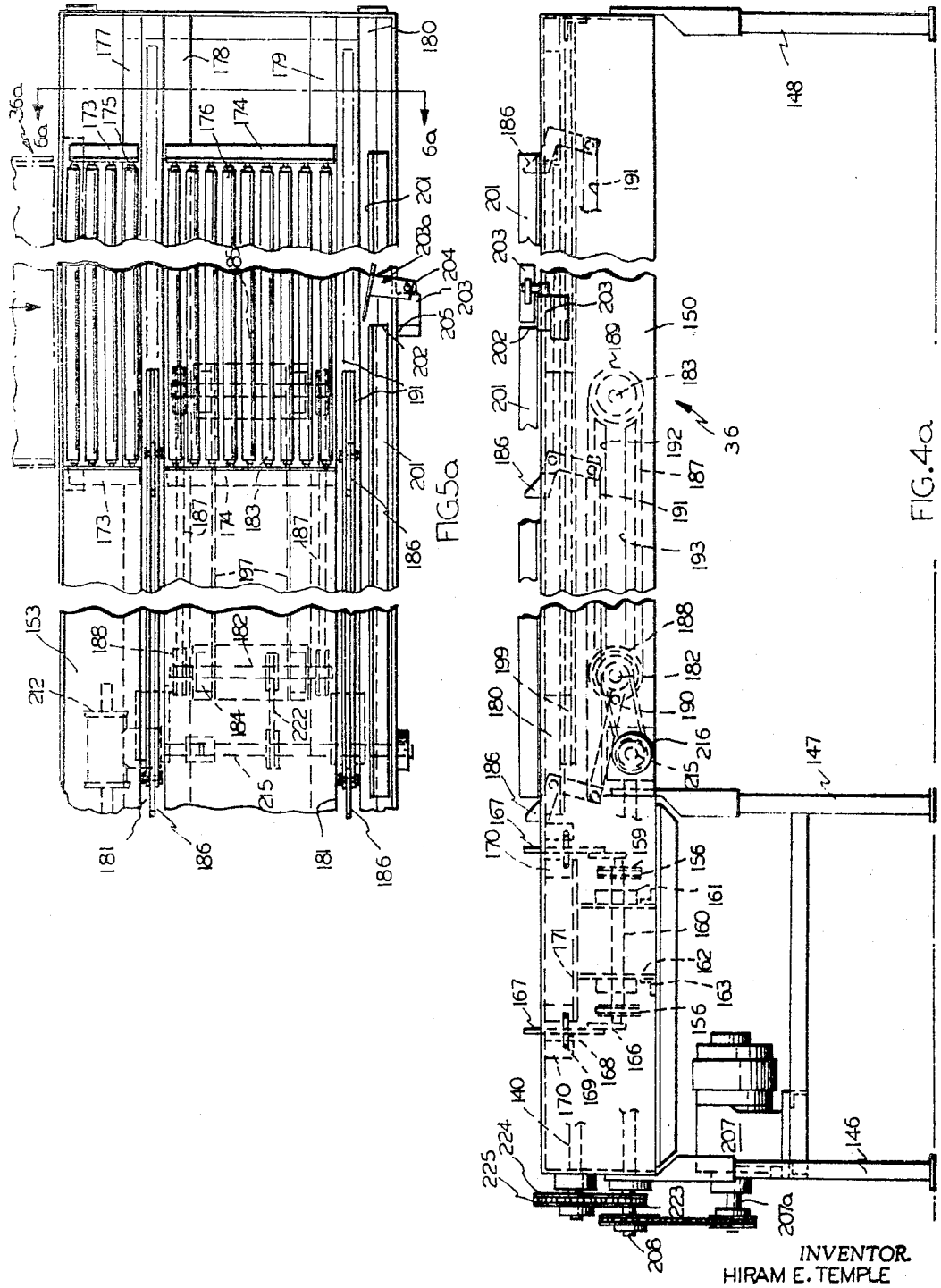
INVENTOR.
HIRAM E. TEMPLE
BY
Learman, Learman & McCulloch
ATTORNEYS Sept. 16, 1969  H. E. TEMPLE  3,466,839
BAKERY PRODUCT HANDLING SYSTEM
Filed July 27, 1966  15 Sheets-Sheet 14

INVENTOR
HIRAM E. TEMPLE
BY
Learman, Learman & McCulloch
ATTORNEYS

INVENTOR.
HIRAM E. TEMPLE

United States Patent Office 3,466,839
Patented Sept. 16, 1969

3,466,839
BAKERY PRODUCT HANDLING SYSTEM
Hiram E. Temple, Saginaw, Mich., assignor to Baker Perkins Inc., Saginaw, Mich., a corporation of New York
Continuation-in-part of application Ser. No. 508,684, Nov. 19, 1965. This application July 27, 1966, Ser. No. 568,269
Int. Cl. B65b 57/12, 35/54, 25/16
U.S. Cl. 53—55
28 Claims

ABSTRACT OF THE DISCLOSURE

An automatic bakery product handling system in which packaged baking products from a battery of spaced-apart packaging machines are deposited on a single-line conveyor which delivers the products to a container loading machine. Each of the packaging machines has a reserved station on which to deposit products on the conveyor and any of the stations not filled, by an inoperative packaging machine, for instance, will be automatically filled by a stand-by packaging machine so that a full complement of properly spaced products is fed to the container loading machine. The loaded containers are delivered to a stacking station where they are stacked and loaded on delivery trucks or stored as desired.

---

The present application is a continuation-in-part of an application Ser. No. 508,684, filed Nov. 19, 1965, which was entitled Farinaceous Product Handling System.

The invention relates to certain novel and useful improvements in bakery product handling systems and more particularly to high speed, automatic palletizing and stacking systems of the general character disclosed in the parent application. The system which will be described and claimed is particularly adapted to the transfer of packaged bread from packaging machinery to trays or baskets which can accommodate a plurality of loaves and which are then stacked and loaded on delivery trucks or stored as desired. Such systems are characterized by the use of a battery of usually unevenly spaced, continuously operating packaging machines which are required to supply enough bread to keep the palletizing and stacking equipment operating at the desired high speeds.

One of the prime objects of the present invention is to design a completely automatic system for delivering packaged bakery products from a battery of operating packaging machines, which may be unevenly spaced apart, to container loading equipment and thence to stacking apparatus.

Another object of the invention is to deliver packaged bread from a series of unevenly spaced packaging machines to a single conveyor for supplying the container loading machine which is coordinated with the conveyor.

Still a further object of the invention is to provide a system of the character described in which each packaging machine has a reserved station on which to deposit products on the conveyor and in which many of the stations not filled, by an inoperative packaging machine, for instance, will be automatically filled by a stand-by packaging machine or stand-by packaging machines so that a full complement of properly spaced products is fed to the containerizing unit.

Other objects and advantages of the invention will be pointed out specifically or will become apparent from the following description when it is considered in conjunction with the appended claims and the accompanying drawings, in which:

FIGURE 2 is an end elevational view showing the bread proceeding from a packaging machine to the single take-away conveyor via a transfer unit;

FIGURE 3 is a sectional side elevational view taken on the line 3—3 of FIGURE 2 and further illustrating the sweep type transfer unit employed;

FIGURE 4 is a top plan view thereof;

FIGURE 1a is a side elevational view illustrating the manner in which the groups of packaged bread loaves are delivered to the containers, the containers being illustrated as baskets of a size to accommodate two groups of loaves and the leading container being shown as partially loaded;

FIGURE 2a is a top plan view thereof taken on the line 2a—2a of FIGURE 1a;

FIGURE 3a is a sectional top plan view of the drive and transfer mechanism involved in supplying the baskets to be loaded, taken on the line 3a—3a of FIGURE 1a;

FIGURE 4a is an end elevational view thereof taken on the line 4a—4a of FIGURE 3a;

FIGURE 5a is a fragmentary top plan view of a portion of the basket supplying conveyor mechanism illustrated in FIGURE 4a;

FIGURE 6a is an enlarged, fragmentary, sectional elevational view taken on the line 6a—6a of FIGURE 5a;

FIGURE 1b is an end elevational view of container stacking apparatus showing the stack lifting mechanism in raised position;

Figure 1:
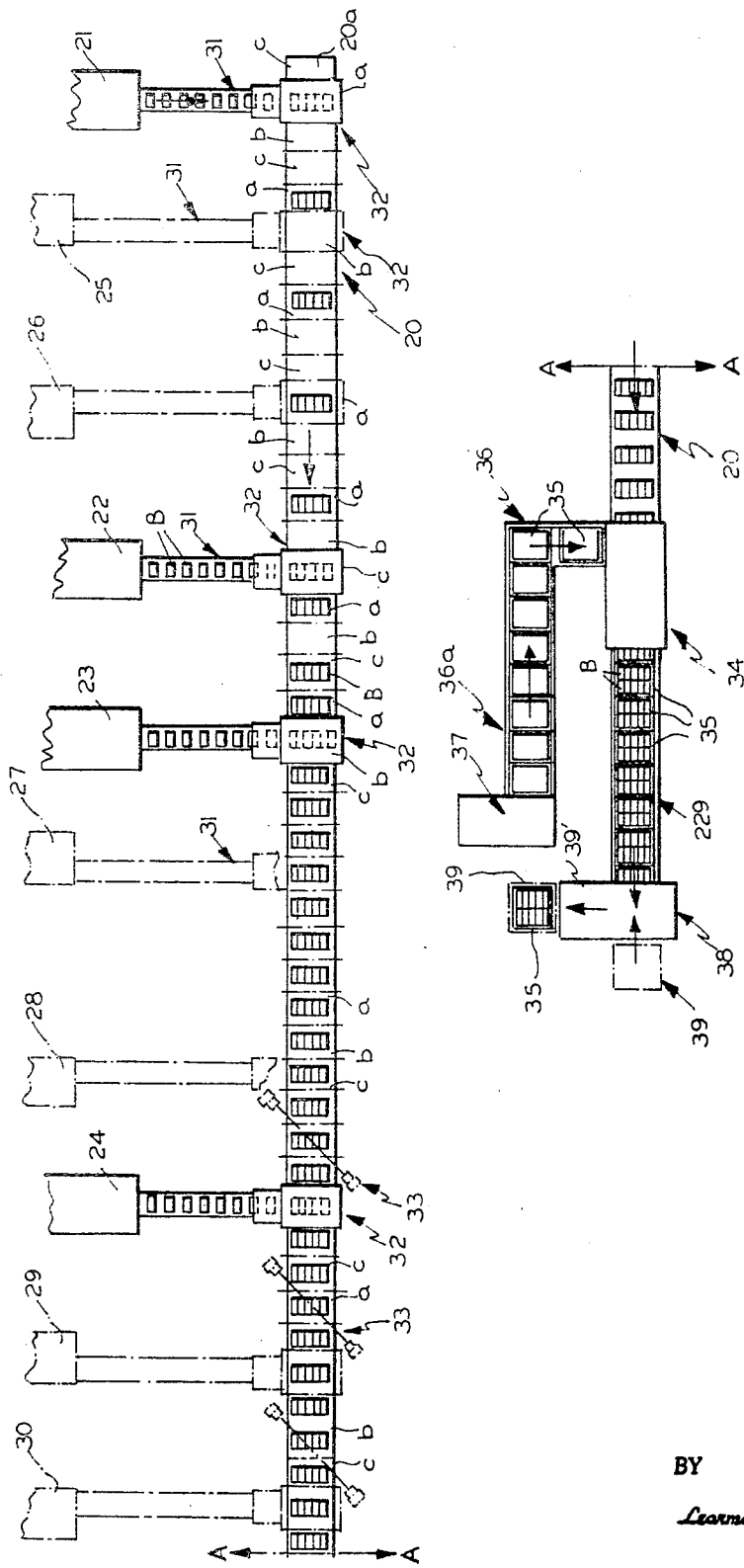
FIGURE 1 is a schematic top plan view illustrating the system and showing the packaged bread loaves proceeding therethrough.

Referring now more particularly to the accompanying drawings and, in the first instance, to FIGURE 1 for a general description of a preferred embodiment of the system only, a main conveyor generally designated 20 is shown as generally bridging or spanning a plurality or battery of packaging machines, which may comprise bread wrapping machines 21–24 and bread bagging machines 25–30. For the sake of convenience of illustration only, the bagging machines 25–30 and their associated elements are shown in chain lines, whereas the wrapping machines 21–24 and their associated elements are illustrated in solid lines.

The wrapping machines 21–24 may be considered to be conventional wrapping machines of the character illustrated, for instance, in the Kilgard et al. United States Patent No. 2,792,677, or the Waite United States Patent No. 3,075,326, and the bagging machines may be conventional loaf bagging machines such as the Mark 50, manufactured by Commodity Packaging Company, Inc., of Yakima, Wash., U.S.A. Each of the machines 21–30 should be considered as being connected with a delivery conveyor generally designated 31 comprising a portion of a loaf grouping and delivering transfer unit generally designated 32 which, at the proper time and in the event certain predetermined conditions exist, will deliver a group of loaves to the main line conveyor 20.

The conveyor 20, which is a continuously traveling endless conveyor moving at a constant speed, has its endless conveying surface 20a divided into imaginary increments or stations a, b, and c of a predetermined length, such as two foot increments, and the system is set to deliver a group of lengthwisely disposed loaves, generally designated B, to the conveyor 20 in a manner such that each station a–c is occupied by a group of bread loaves B. It is to be understood that the baker has the option of running either the wrapping machines 21–24 or the bagging machines 25–30 and, for the sake of convenience, it will be assumed in the discussion to follow that the wrapping machines 21–24 are to be first used. Accordingly, the transfer units 32 of the wrapping machines 21–23 are set to deliver groups of bread loaves B to the spaces or increment a–c, respectively, on the endless conveyor surface 20, and the wrapping machine 24 constitutes an auxiliary or stand-by unit which automatically loads any space a, b or c which for some reason, such as a temporary shutdown of one of the machines 21–23, is empty when it reaches the machine 24. Thus, it will be seen that the delivery unit 32 of machine 21 delivers to every space a, the delivery unit 32 of machine 22 delivers to the spaces c, and the delivery unit 32 of machine 23 delivers to the spaces b. While the stations a–c in the embodiment of the invention illustrated herein are to receive groups of five packaged bread loaves disposed lengthwise to the longitudinal path of travel of the conveying surface 20, it is to be understood that single loaves with their longitudinal axes disposed crosswise to the surface 30 could be delivered to any of the stations and that the length of the stations may be varied as desired. While an electrical control circuit which will be described is provided to control the transfer units 32 and therefore the delivery of bread loaves B to the various stations a–c, it is to be understood that generally speaking the packaging machinery 21–24 and delivery conveyors 31 must be operated at a predetermined speed relative to the speed of moving conveyor 20 so that a supply of bread loaves will be available at the delivery apparatus stations 32 to feed the empty spaces on the conveyor 20 as the conveyor 20 continuously moves past the battery of machines. This is, of course, true whether the wrapping machines 21–24 are being used or the bagging machines 25–30 are being used. Sensing units generally designated 33, which may comprise electric eye assemblies, are provided upstream of the auxiliary or stand-by packaging machines 24, 29 and 30 to indicate whether one of the stations a–c is empty and should be loaded.

As will be readily understood, the lower view in FIGURE 1 is simply a continuation of the upper view which terminated at the line A—A, and it will be seen that the conveyor 20 delivers the groups of loaves B to a container loading unit generally designated 34 which, in the present instance, will be illustrated as loading the groups of bread loaves B into baskets generally designated 35, each basket 35 being of a size to accommodate two groups of loaves B.

The baskets 35 are of the type which may be vertically stacked in tiers, one atop the other, and thus are sufficiently deep so that the loaves of bread contained therein do not interfere with the stacking operation. Rims 35a are provided on the preferably perforate baskets 35a, as are stacking lugs 35b which extend above the level of the rims a predetermined distance. A basket conveyor generally designated 36 delivers individual baskets 35 to the basket loading unit 34 from a basket unstacking station generally designated 37. Once the loaves B are loaded in the baskets 35, the baskets 35 move to a basket stacking device generally designated 38 which stacks them on empty wheeled dollies generally designated 39, so that they may be readily removed to a storage area or to delivery trucks.

The delivering and grouping units

Since each of the transfer units 32 may be considered to be identical, a description of only one of these asemblies will suffice. As shown particularly in FIGURES 1 and 2, the loaves of packaged bread B are fed to the loaf grouping and delivery machines 32 on the conveyors 31 thereof crosswise or broadside to the direction of travel which they will take on the conveyor 20. Each assembly 32 (see FIGURES 2–4) includes a frame generally designated 40 including inner and outer support legs 41 and 42, respectively, disposed on either side of the endless conveyor 20, and rear support legs 43. The legs 41–43 extend above the level of the conveyor generally indicated 20 which may be considered as having an endless member 20' trained around end roller member 44 supported by shafts 45 and driven continuously by a suitable electric motor 46 (FIGURE 5) at a predetermined rate of speed.

Side frame members 47 connect the pairs of legs 41 and 43 at the upper ends thereof and the legs may be connected intermediate their ends by supports 48. The bread loaves B move from a packaging machine such as wrapping machine 22 (illustrated in FIGURES 2–4) to the conveyor generally designated 31 which may comprise what is termed in the trade a "magic carpet" conveyor. As shown, a "magic carpet" conveyor comprises a pair of transversely spaced apart, endless chains 49 having links which are connected by rotatably mounted rollers 50. The chains 49 are trained around rear sprockets 51 and front sprockets 52 mounted by shafts 52a and 53, respectively, which are journaled in bearings 54 and 55, respectively, on the side frame members 47. As FIGURE 2 indicates, guides 49a mounted by the side frame members 47 support the upper and lower runs of the conveyor chains 49. A motor unit 56 supported on the platform 48 may be employed to drive the shaft 53 through the medium of a chain 57 trained around a sprocket 58 on the output shaft 59 of the motor unit at its lower end and around a sprocket 60 on the shaft 53 at its upper end.

Supported by the posts 41 and 42 above conveyor 20 is an overhead frame unit generally designated 61 having socket members 62 which are telescopically received on the posts 41 and 42. The members 62 support an enclosure comprising side walls 63 and 64, and a top wall 65. Mounted on angle brackets 66 spanning the sockets 62 on either side of the conveyor 20 are support rails 67 which journal a series of idler rolls 68 which are supported at the level of the rollers 50 on the upper run of conveyor 31. The frame 61, which includes channel braces 69 connecting its side walls 63 and 64, houses an intermittently operated sweep assembly, generally designated 71 in FIGURE 2, which is employed to move a group of bread loaves B from the rolls 68 to the endless conveyor surface 20' passing below.

The sweep assembly generally designated 71 comprises a pair of spaced apart, endless chains 72 trained around sprockets 73 on a shaft 74 journaled by bearings 75, and around sprockets 76 provided on a shaft 77 journaled in bearings 78 which are also mounted on the side wall members 63 and 64. A pair of sweep members 79 are supported by the endless chains 72 at equally spaced intervals, the sweep bars 79 being mounted on bars 80 connected with a cross brace 81 which mounts to brackets 82 secured to certain links of the chains 72. Chain support guides 82a are provided for the lower runs of chains 72 to guide the chains when the bars 79 engage the loaves B.

Provided to intermittently drive shaft 74 when bread loaves B are grouped on rolls 68 is a motor unit 83 having an output shaft 84, a drive chain 85 for shaft 74 being trained around a sprocket 86 on the shaft 74 and around a sprocket 87 on the motor output shaft 84.

Figure 5:
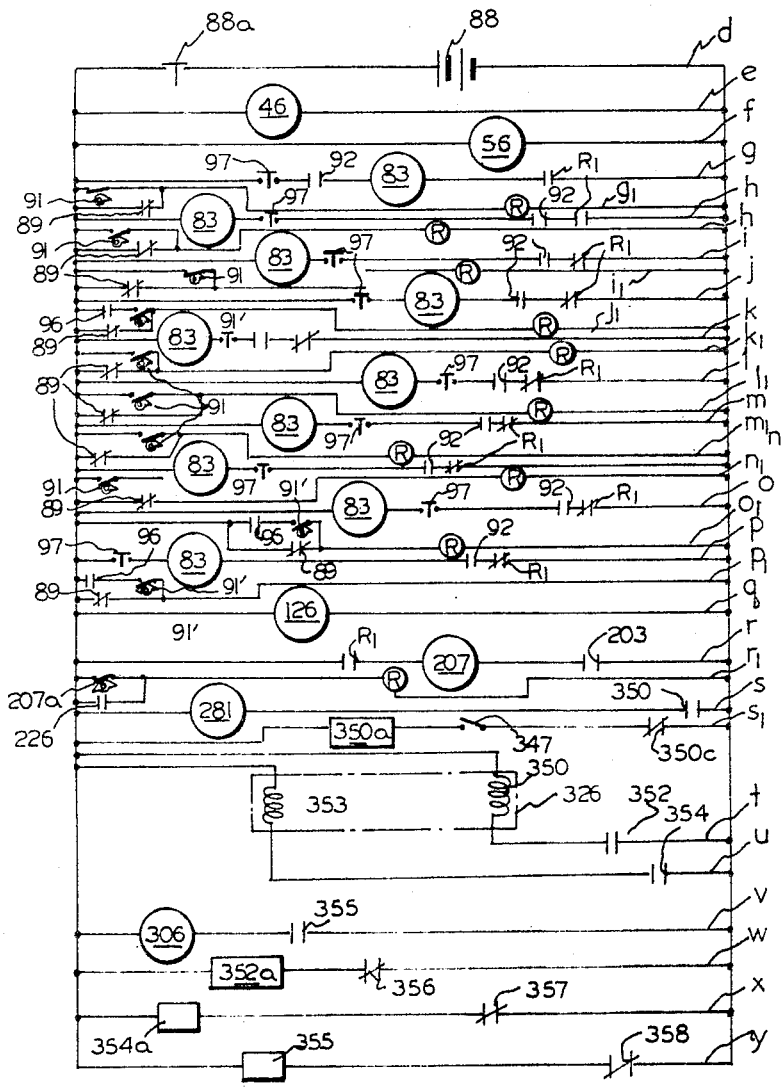
FIGURE 5 is a schematic electrical control circuit which may be employed.

In FIGURE 5 I have shown a typical control circuit including a power source or a connection to a power source at 88 in series with an on-off switch 88a in a circuit line d. A circuit line e is provided for the continuously operating motor unit 46 driving power conveyor 20 and a circuit line f for motor unit 56. Connected in circuit lines g–j are the sweep operating motors 83 for driving the sweeps of the respective transfer units 32 of the packaging machines 21–24. Each transfer machine 32 includes a switch 89 (see FIGURES 2 and 3) including a dependent switch tripping lever 90 which, when operated by a sweep bar 79, stops the particular motor 83. Each unit 32 for machines 21–23 also has a cam operated switch 91 provided in a conventional switch cam box, such as a Gemco switch box, which closes a circuit to energize a holding relay R to operate the sweep 79 at a proper time to deposit a group of bread loaves on the station a, b or c, dependent on which of the units 21, 23 or 22 is to be operated at that particular time. The relays R, which are connected in each instance in circuit lines $g_1$–$i_1$ as the case may be, have contacts $R_1$ in series with motors 83 and it will be observed that the contacts 89a of stop switches 89 are in parallel with the cam switches 91 to break these contacts $R_1$ by deenergizing relays R. Further, each of the circuit lines g–j has a switch 92 which indicates that a plurality of bread loaves of a designated number has been grouped and is in position to be transferred. As FIGURES 2 and 3 indicate, this switch comprises a pivotally mounted, spring returned gate member 93 pivoted on a support post 94. In FIGURES 2 and 3 the gate 93 has been moved to a position in which it closes the switch 92 so that bread may be transferred by one of the sweep bars 79 to the conveyor surface 20'.

The motor 83, which is the motor driving the delivery unit 32 of stand-by wrapping machine 24, has a sensing switch 96 in its circuit line $j_1$ in addition to a three-lobed cam operated switch 91' designed to close to properly delivery to any of the spaces a–c but is similarly controlled by a relay R and stop contacts 89a. The switch 96 is a normally open switch which is closed only when the electric eye assembly 33 upstream of the delivery unit 32 of the machine 24 indicates that there is an empty space to be filled. Eye assembly 33 is diagonally disposed to sweep the areas a–c. As a precautionary measure, in some installations such eye assemblies 33 and cooperative switches 96 could be incorporated ahead of each of the units 21–23 in series with the cam switches 91.

In the operation of a transfer assembly 32, bread loaves B are moved on the "magic carpet" conveyor 31 forwardly, as shown in FIGURES 1–3, and as they move forwardly push the gate member 93 from a position in which it is disposed at a slight angle with respect to rolls 68 to the parallel position in which it is shown in FIGURE 2. At this time, switch 92 is closed, so that the group of bread loaves B may be transferred at the proper time. When the cam switch 91 (which is mounted on the continuously driven shaft in the switch box driven by the conveyor 20) closes, holding relay R is energized and closes its contacts $R_1$ to start the sweep motor 83 and keep it operating to move the upper sweep bar 79 counter-clockwisely and to transfer the group of loaves B to conveyor surface 20'. Motor unit 83 remains operative until spring returned contacts 92 are opened momentarily by the other sweep bar 79 at the end of the sweep cycle.

As previously noted, operation of the motor 83 of the transfer unit 32 for machine 21 will load the stations a, and operation of motors 83 of the like delivery units 32 for wrapping machines 22 and 23 will load the spaces c and b, respectively. For the sake of convenience, only some of the lines a–c are shown in FIGURE 1, but it is to be understood the whole upper run of conveyor 20 is so divided by imaginary lines. If, for some reason, one of the machines 21–23 is shut down for a period of time, the electric eye assembly 33 ahead of wrapping machine 24 will sense that one of the stations a, b or c is empty and will operate the stand-by transfer unit 32 associated with wrapping machine 24 to load the empty space.

Similarly, if it is desired to use the baggers 25–30, it is to be understood that they operate in the same way, only in the case of these baggers, a pair of stand-by bagging units 29 and 30 are provided. In FIGURE 5 the motors 83 driving the delivery units 32 for the bagging machines 25–30 are connected in circuit lines k–p. Of course each of the stand-by units 29 and 30 is similarly operated only when one of the electric eye switches 96 is closed, to indicate the availability of an empty space. Manually operated on-off switches 97 in each of the lines permit the system to be changed over as desired.

The container loading mechanism

As FIGURE 1 indicates, the groups of bread loaves B are delivered to a basket loader generally designated 34 which is supplied with baskets 35 by a basket conveyor generally designated 36.

As FIGURES 1a and 2a indicate, the unit 34 is disposed just forwardly of the conveyor 20 and includes an upper conveyor system generally designated 98 to which the groups of bread loaves B are supplied by the conveyor 20, and a lower conveyor system generally designated 99 beneath the conveyor system 98 and in converging relation therewith to supply baskets 35 to which the groups of bread loaves B may be transferred. Support posts 100 are provided to support both units 98 and 99 one above the other, as shown particularly in FIGURE 1a.

Figure 7A:
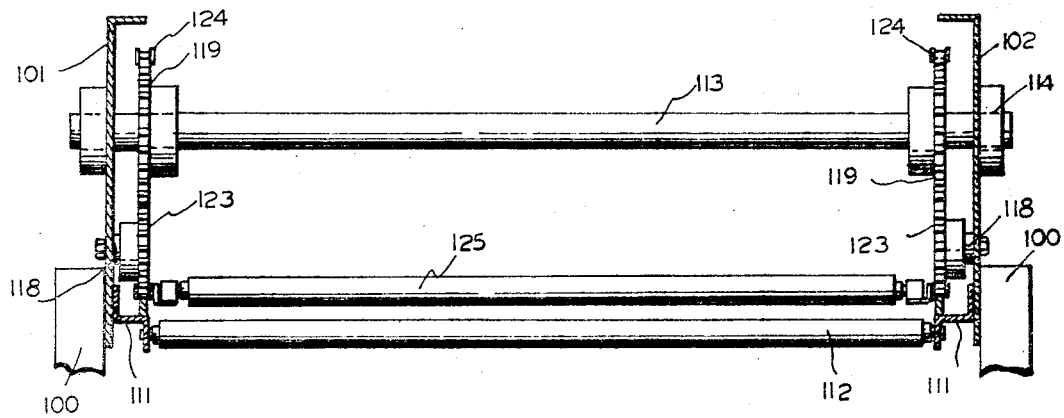
FIGURE 7a is an enlarged, transverse, sectional elevational view taken on the line 7a—7a of FIGURE 1a and particularly illustrating the bread loading bar mechanism.

The upper conveyor assembly 98 includes a pair of side plate members 101 and 102 between which a "magic carpet" conveyor generally designated 103 in FIGURE 1a is shown disposed immediately ahead of conveyor 20, the conveyor 103 comprising spaced apart endless chains 104 between which rollers 105 are rotatably connected. At their rear ends the chains 104 are trained around sprockets 106 mounted on a shaft 107 journaled in bearings 108 on the side frame members 101 and 102, and at their front ends the chains may be trained around side guides 109 connected by spacers 109a and supported by brackets 109b. The "magic carpet" conveyor 103 is preferably driven from the conveyor 20 by a connecting drive belt 110, shown in FIGURE 1a, which may be trained around appropriate drive sprockets on the shaft 107 and on the front shaft 20a of conveyor 20, so that the "magic carpet" conveyor 103 is driven continuously with the conveyor 20. Supported forwardly of the "magic carpet" conveyor 103 are a pair of side members 111 (FIGURE 1a) which rotatably mount idler rolls 112, as shown in FIGURES 1a, 2a and 7a, and the bread is moved from the "magic carpet" conveyor 103 to the idler rolls 112 by loader or pusher means which will now be described.

Supported above the rolls 112 on the side rails 101 and 102 are a front shaft 113, which spans the walls 101 and 102 and is journaled in bearings 114, and stub shafts 115, 116, 117 and 118. Sprockets 119 are mounted on the shaft 113 and sprockets 120, 121, 122 and 123 on the shafts 115–118, respectively. Chains 124 are trained around the sprockets 119–123 and mounted between the chains, to be carried by them, are a series of spaced apart pusher rods 125, journaled in bearings 125a at their ends and connected with the chain links by members 125b. To drive the chains 124, the shaft 126 which drives conveyor end roll 20a is extended and a sprocket 127 thereon is connected with a smaller diameter sprocket 128 on shaft 113 by means of a drive chain 129. The shaft 113 is driven at such a speed that the downwardly inclined runs 124a of the chains 124 have a horizontal speed component which is the same as the horizontal speed of conveyor 20 and "magic carpet" conveyor 103. The lower run 124b accordingly travels at a faster rate of speed in moving the groups of bread loaves B onto and along the idler rolls 112 to the baskets 35 and operates to "space out" the groups.

Figure 8A:
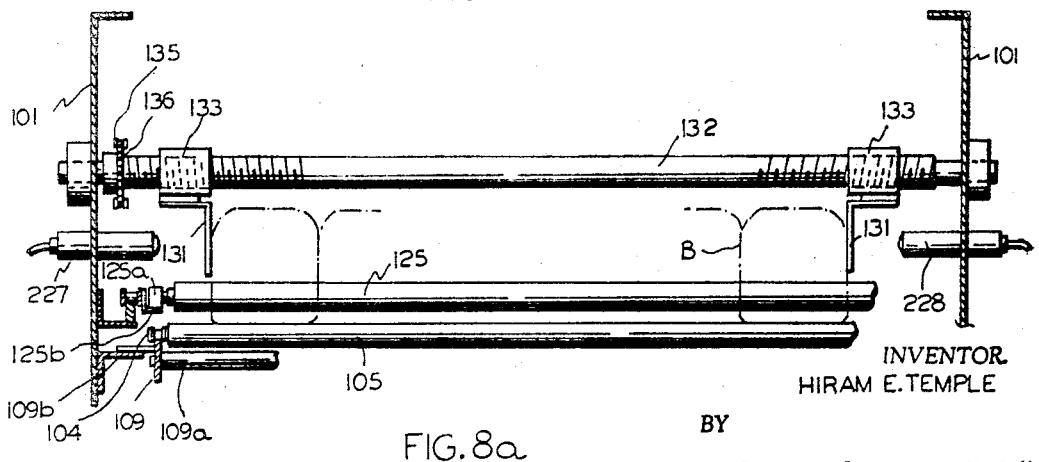
FIGURE 8a is a similar view taken on the line 8a—8a of FIGURE 1a illustrating the bread sensing mechanism and bread guide adjusting mechanism.

As FIGURES 2a and 8a indicate, longitudinal guides 131 are provided for transversely aligning the bread loaves B and are supported by front and rear shafts 132 having threads of opposite hand on their respective ends. The elongate brackets or guides 131 are supported by nut members 133, which of course, cannot rotate with the shafts 132 but will be moved transversely thereon when the shafts 132 are rotated. As FIGURE 1a indicates, a handle member 134 is provided on the rear shaft 132 and a drive chain 135, trained around sprockets 136, connects the respective shaft 132 so that, upon rotation of the rear shaft 132, the front shaft 132 is also rotated.

Figure 9A:
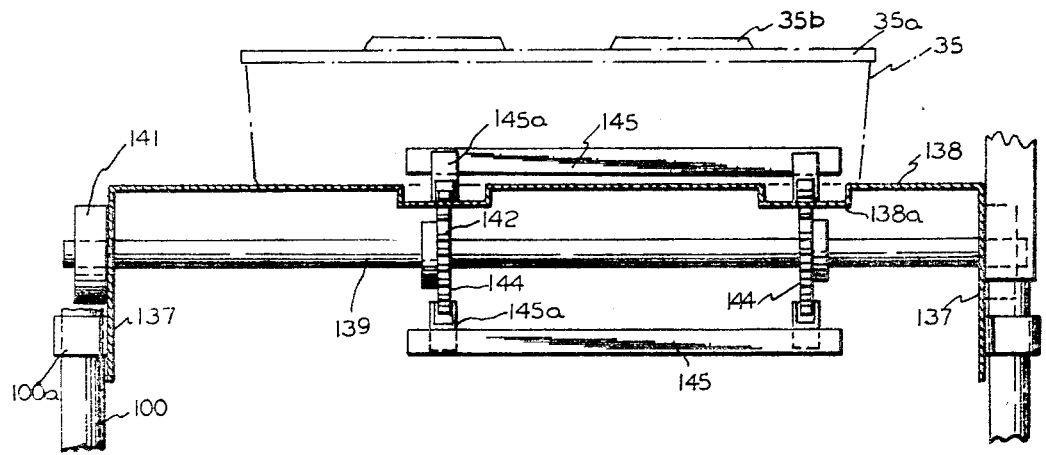
FIGURE 9a is an enlarged, transverse sectional view taken on the line 9a—9a of FIGURE 1a through a portion of the basket supplying conveyor unit.

The upwardly inclined lower conveyor unit 99 for moving the baskets 35 forwardly is also supported by the posts 100 by means of straps 100a and includes a housing comprising side walls 137 and a top wall 138 (see FIGURES 3a and 9a). A pair of shafts 139 and 140 journaled in bearings 141 are supported by the side walls 137 and have, respectively, front and rear sprockets 142 and 143 fixed thereon. Chains 144 are trained around the sprockets 142 and 143 and support pusher flights 145 at spaced intervals between them which are mounted to the chains 144 by clevises 145a. The top wall 138 is recessed as at 138a to provide guide surfaces for chains 144.

Rearwardly of the unit 99 is a similarly inclined basket transfer unit generally designated 99a which comprises pairs of support legs 146, 147 and 148 (see FIGURE 4a). These legs support a frame including side walls 149 and end walls 150. Also provided are top wall portions 151, 152 and 153 which are spaced apart as shown to provide a pair of slots 154 and 155 in longitudinal alignment with the recessed portions 138a of the top wall 138. Mounted beneath the medial top wall portion 152 are a pair of endless chains 156 which are trained around sprockets 157 on a shaft 158 at their front ends and are trained around sprockets 159 on a shaft 160 at their rear ends. The shafts 158 and 160 are journaled in bearings 161 supported on spaced apart side plates 162 (FIGURE 4a) which are anchored by angle members 163, and upper and lower guide members 164 (FIGURE 1a) for the chains 156 may be supported from the side plate members 162 by spacer members 165 (FIGURE 3a).

Each of the chains 156 carry a front and rear bar 166 to which an angular pusher 167 (see FIGURE 4a) is attached to extend up into one of the slots 154 and 155. To insure that there will be lateral stability of the pushers 167, a cross piece member 168 affixed thereto guides in slots 169 provided in guide bars 170 which are supported by members 171 spanning the plates 162. The pusher fingers 167 feed baskets 35 to the conveyor lines 144 and are themselves adapted to receive baskets 35 proceeding perpendicularly to the main line of travel of the bread loaves and the baskets which are moved into position to receive them.

The basket conveyor generally designated 36 moves baskets in front of the rearwardly disposed pusher fingers 167 at a time when fingers 167 are stopped in rearward position and, as shown in FIGURES 1a and 3a, a basket stop and guide bar 172 is mounted on the top wall portion 151. The basket conveyor 36, which is illustrated particularly in FIGURES 3a–5a, receives baskets from an angular portion generally designated 36a leading from the basket unstacker station 37. Pairs of angle supports 173 and 174 are provided in line with the conveyor portion 36a and support idler rolls 175 and 176, respectively, in position to receive the baskets from conveyor 36a. The angle members 173 and 174 are mounted on spaced apart support rail members 177, 178, 179 and 180. The supports 177 and 178, and 179 and 180 are spaced apart to provide conveyor accommodating spaces between them and it will be seen that the top surface 153 (see FIGURES 3a and 5a) is also slotted as at 181 in alignment with the spaces.

Figures 6B, 7B:
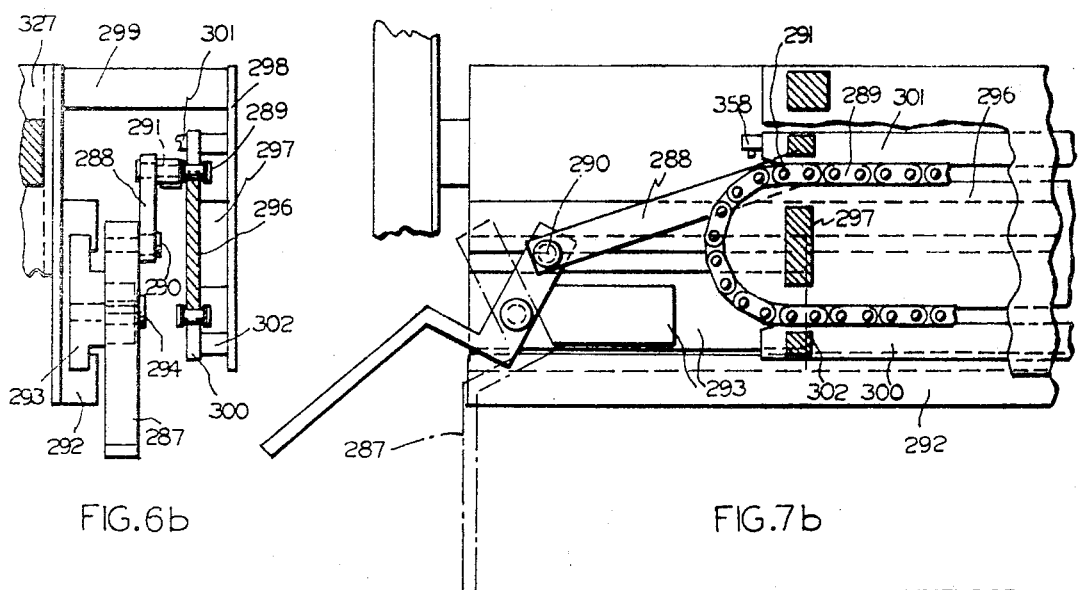
FIGURE 6b is an enlarged, transverse, sectional elevational view taken on the line 6b—6b of FIGURE 4b.
FIGURE 7b is an enlarged, fragmentary, sectional elevational view taken on the line 7b—7b of FIGURE 2b.
Figure 6A:
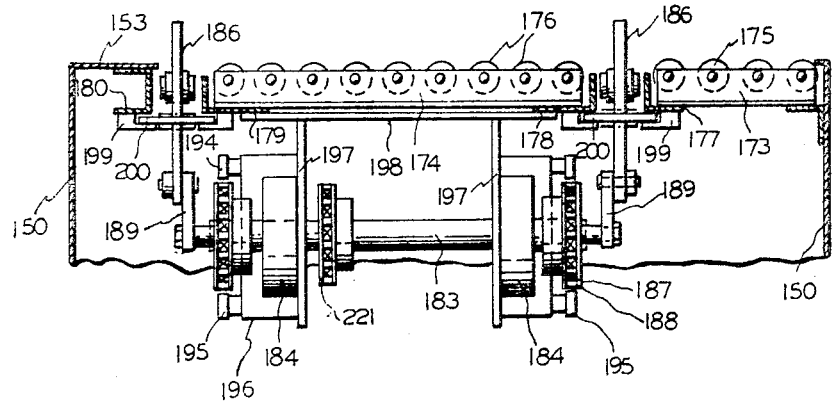

Mounted between the slots 181 are shafts 182 and 183 which are journaled as at 184 in bearings provided on supports 185 (FIGURE 6a). Front and rear pusher fingers 186 are similarly pivotally connected to the chains 187, which are trained around the front and rear sprockets 188 on shafts 182 and 183, by connecting bar members 189. These pusher members may be of the same construction as the pusher members 167 previously described. At their lower ends the series of angular members 186 are connected by bars 191 so that all move in unison. The chains 187 are supported intermediately by upper and lower guide members 192 and 193 and, as FIGURE 6a indicates, guides 194 and 195 are also provided along the exterior surfaces of the chains, above and below them, the guides 194 and 195 being supported by support blocks 196 mounted on the same pair of vertical plates 197 which support the bearings 184. The plates 197 depend from a support plate 198 which spans the supports 178 and 179. Also supported by the support rails 177–180 are angular guides 199 which constitute ways for cross pieces 200 (see FIGURE 6a) which are connected to the pusher finger members 186.

Provided in the path of oncoming baskets from conveyor 36a, which may be any suitable endless type conveyor, is a guide rail 201 which is interrupted as at 202 (see FIGURE 5a) so that a switch 203 having a gate 203a pivotally mounted as at 204 on a bracket 205 may be employed to be sure that baskets are in proper position on the rollers 175 and 176 ready to be transferred forwardly by the fingers 186.

The chains 187 are driven by the same motor 207 (see FIGURE 3a) which is employed to drive the chains 156 and the chains 144. A shaft 208, supported by a bearing 209 and coupling 210, extends crosswise downstream of the chains 156 and is connected through coupling 210 with the input shaft 211 of a right-angle drive transmission unit 212 which includes an output shaft 213 connected by a coupling 214 with a drive shaft 215 journaled by the coupling 210 and a bearing 216 on side wall 150. The shaft 208 is driven from motor 207 by a chain 207a trained around a sprocket 208a on shaft 208 and around a sprocket 207b trained around the output shaft 207c of motor unit 207. A sprocket 217 fixed on shaft 208 drives a sprocket 218 provided on shaft 158 via a chain 219 to operate chains 156, and a sprocket 220 on shaft 215 drives a sprocket 221 fixed on shaft 182 via a chain 222 to operate chains 187. The shaft 140 (see FIGURE 3a) is driven by a sprocket 223 which is connected with a sprocket 224 mounted on the shaft 140 by a chain 225. The motor 207 for driving chains 156, 187, and 144 at a faster speed than chains 124 is an intermittently driven motor disposed in circuit line (see FIGURE 5) in series with the normally open contacts 226 of an electric eye assembly which, as usual, includes an opposite beam projector 227 and a receiver 228.

In operation, and assuming a basket 35 to be in position on the rollers 175 and 176 so that switch 203 is made, and further assuming baskets 35 to be on the conveyor 6, the circuit to motor 207 is first made when a loaf of bread B interrupts the beam of the electric eye unit 227. This causes the chains 144 to be moved forwardly a distance corresponding substantially to the length of a loaf, since in the present instance two groups of loaves are to be deposited in each basket 35. At the same time, as FIGURE 1a indicates, the pusher fingers 167 at the rear of unit 99a will be moved forwardly until they engage the basket 35 in their path and will move this basket onto the chains 144. The motor 207 which is started by eye 226 is stopped by a cam switch 207a in a circuit line $r_1$ in series with a relay R having normally closed contacts $R_1$ in circuit line r. The cam lobes are positioned so that the motor 207 moves a greater distance than the length of a loaf when a new basket 35 to be filled is to be brought to receiving position to allow for the space between baskets 35. Of course, the chains are operated in timed relation with the chains 124 which drive the pushers 125 conveying the groups of bread loaves B forwardly over the idler rolls 112 so that the loaves and baskets are simultaneously moved forwardly and the loaves drop into proper position.

Simultaneously with the movement of chains 144 and 156, baskets 35 on the conveyor 36 are moved forwardly by the pusher fingers 186. The relative speeds of conveyor chains 144, 156 and 187 are such that movement of a first basket 35 above chains 156 forward half its length will move a second basket 35 on the conveyor chains 187 forwardly into a position such that, upon the next movement of the first basket 35 over to chains 144, the second basket 35 will be moved into position above chains 156.

The basket stacking apparatus

Figure 2B:
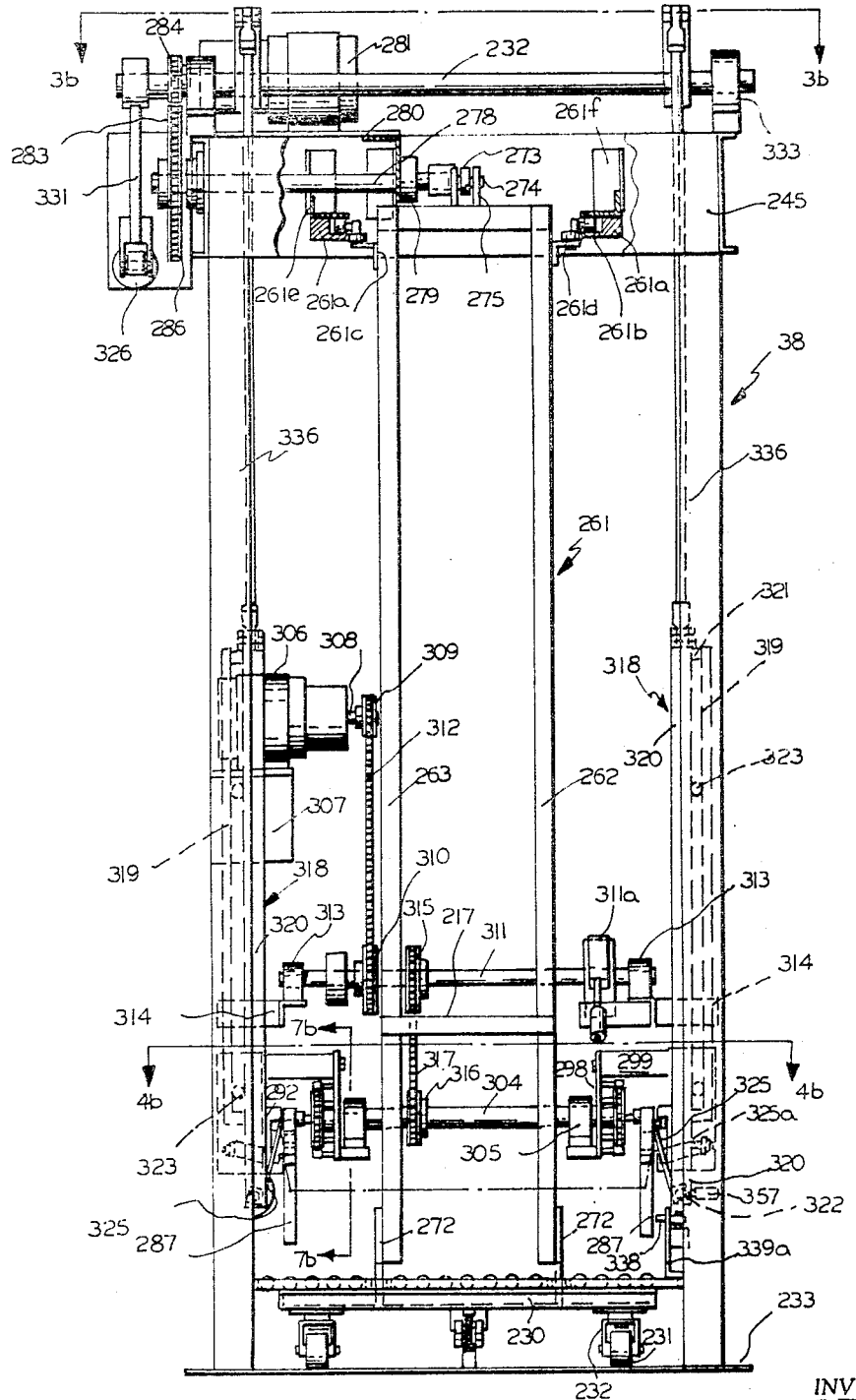
FIGURE 2b is a side elevational view thereof.

From the basket loading apparatus 35, the baskets 35 move on a conventional gravity roll conveyor generally designated 229 to the basket stacking apparatus generally designated 38 where they are stacked on dollies 39. As best shown in FIGURES 1b and 2b, each dolly comprises a shallow receptacle frame 230, sized to receive one of the baskets 35, and supported by caster wheels 231 via wheel fork members 232. As will appear hereinafter, the dollies 39 are used to support a stack of filled baskets which may then be removed to a place of storage or to delivery trucks. In the device which will be described, the baskets are stacked from the bottom in the sense that the stack of baskets is lifted and a basket is placed thereunder until a stack of desired height is built up.

Figure 5B:
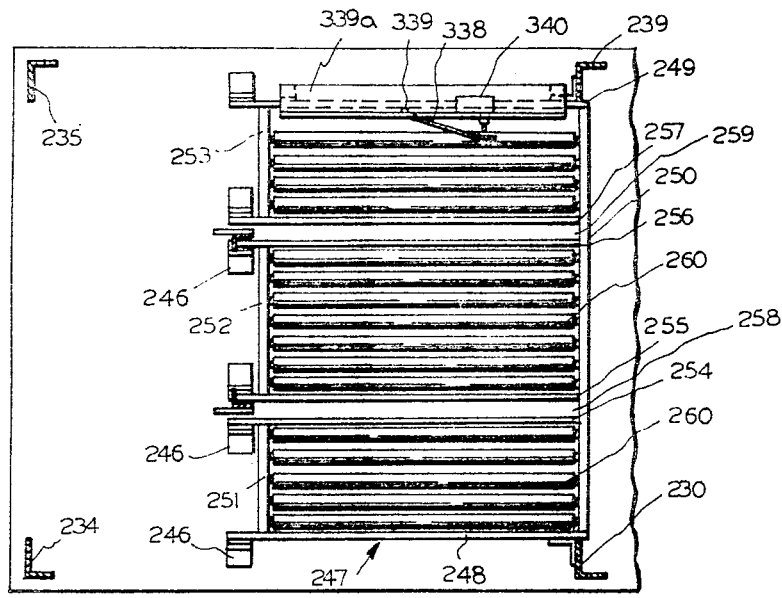
FIGURE 5b is a sectional plan view taken on the line 5b—5b of FIGURE 1b to illustrate the container receiving rolls.

As FIGURES 1b and 2b particularly indicate, the stacking device 38 includes a base plate 233 on which upright support columns 234, 235, 236, 237, 238, 239, 240 and 241 are fixed. At the upper end of the framework thus formed these vertical support rails or columns are connected by end rail members 242 and 243 and side rail members 244 and 245. As illustrated in FIGURES 1b and 5b, supports 246 are provided on the platform 233 at a spaced distance from the vertical rail members 238 and 239 which is of sufficient width to accommodate a dolly 39. The members 246 support one end of an idler roll assembly generally designated 247 on which the baskets 35 are received from the gravity conveyor 229, the idler roll assembly 247 being supported at its other end by the rails 238 and 239. Idler roll assembly 247, as shown, comprises end portions 248 and 249, a side member 250, and opposite side sections 251–253. Spaced apart end partition members 254 and 255, and 256 and 257, provide slots or spaces 258 and 259, respectively, in the assembly for a purpose which will be described. The rotatable idler rolls 260 on which the baskets 35 are received are journaled between the side member sections 251, 252 and 253, and end member 250.

As previously indicated, the dolly 239 is initially received in the space between supports 246 and vertical columns 238 and 239 beneath the idler roll assembly 247, and thence is, at the proper time, moved over to the station 39′ in which an identical dolly is shown in FIGURE 1b in position to receive successive baskets 35. The dolly is moved to this station 39′ by a pusher assembly 261 which initially moves a dolly 39 to the station 39′ and at the same time displaces a dolly which has been stacked with containers 35 to the desired height.

Figure 3B:
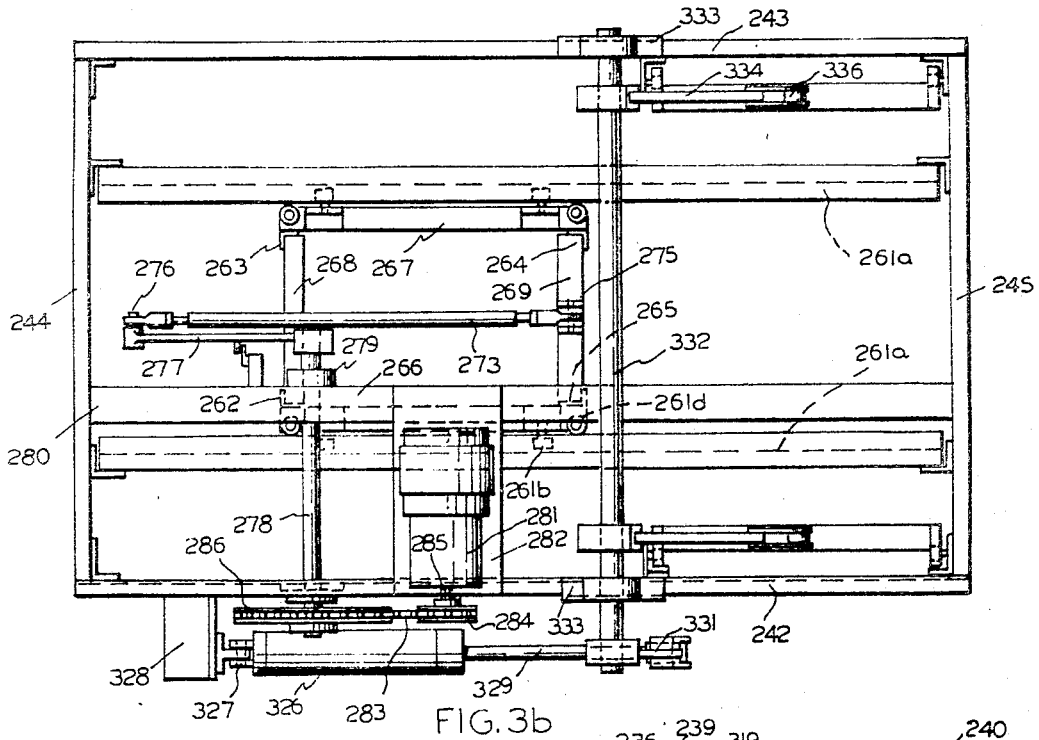
FIGURE 3b is a top plan view taken on the line 3b—3b of FIGURE 2b.

As FIGURES 1b and 3b indicate, the pusher assembly 261 comprises a generally rectangular frame including vertical members 262, 263, 264 and 265 joined at their upper ends by side members 266 and 267 and end members 268 and 269. Intermediate side members 270 and end members 271 also connect the vertical members 262–265. At their depending lower ends, the members 262 and 263 are provided with generally channel-shaped dolly engaging pusher members 272, as shown in FIGURES 1b and 2b, which extend through the spaces 258 and 259 provided in the idler roll assembly 247. Upper tracks 261a support the pusher assembly 261 for to-and-fro movement and rollers 261b mounted on the vertical members 262–265 ride on the tracks 261a, roller supporting angle brackets 261c being fixed to the vertical rails 262–265 and also supporting side alignment rollers 261d. The tracks 261a also include cover members 261e connected to braces 261f.

To reciprocate the pusher assembly 261 back and forth from a position in which the pusher portions 272 are located in the position shown in FIGURE 1b to a position in which they are disposed adjacent rails 238 and 239, a connecting rods 273 is employed which is connected by means of a pin 274 to ears 275 provided on the top of pusher frame member 269. At its opposite end, the connecting rod 273 is connected by means of a pin 276 with a crank arm 277 mounted on a jack shaft 278 journaled in bearings 279 supported by a brace member 280 and by top frame member 242. A motor unit 281 mounted on a platform 282 is provided to drive the jack shaft 278 by means of a chain 283 trained around a sprocket 284 on the motor unit output shaft 285, and around a sprocket 286 fixed on the shaft 278.

To move the baskets 35 from the idler roll assembly 247 over to a position above a dolly shown at station 39′, pusher member 287 are provided (see FIGURES 1b, 2b, 4b, 6b and 7b) which are mounted by means of links 288 to endless chain members 289. Pins 290 pivotally connect the pushers 287 with the links 288 and pins 291 pivotally connect the links 288 with the endless chain links 289. Slideways 292 (see FIGURE 6b) which accommodate slide shoes 293 pinned to the pushers 287, as at 294, are provided to insure proper linear travel of the pushers 287 in their forward basket moving stroke. The slideways 292 are supported on vertical angle members 295 welded to the vertical column members 234 and 235. Guides 296 are provided around which chains 289 are trained, the guides 296 being mounted on spacer blocks 297 extending from side rails 298 which are connected to the members 295 by braces 299 and ways 292. Also provided to guide the chains 289 are external guides 300 and 301 (FIGURES 6b and 7b) mounted by spacer bars 302 to the support plates 298.

Sprockets 303 (FIGURE 4b) fixed on a shaft 304 journaled by bearing 305 supported by plates 298 are employed to drive the chains 289, and the shaft 304 is driven by a motor unit 306 (see FIGURE 1b) supported on a bracket 307. Mounted on the output shaft 308 of motor unit 306 is a sprocket 309 which drives a sprocket 310 on an intermediate shaft 311 via chain 312. The shaft 311 is journaled in bearings 313 supported on brackets 314 and mounts a sprocket 315 which drives a sprocket 316 fixed to the shaft 304 via a chain 317.

Figure 4B:
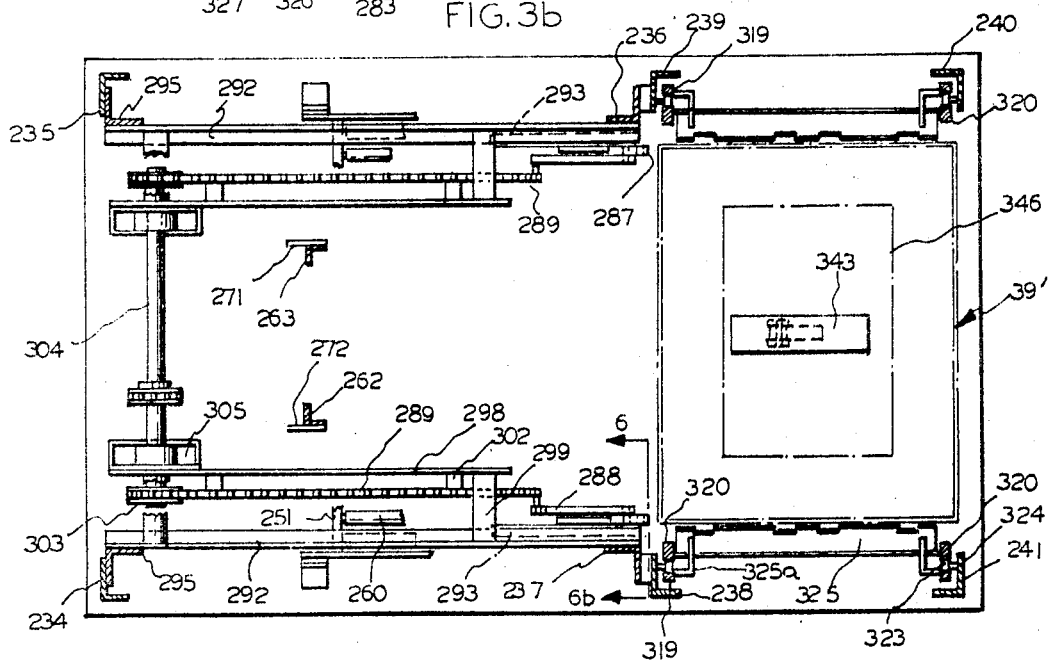
FIGURE 4b is a sectional plan view taken on the line 4b—4b of FIGURE 2b.

To lift the stack of baskets 35 which has been built up on a dolly at station 39′ so that a successive basket 35 may be moved across the idler roll assembly 247 to a position beneath them, lift frames generally designated 318 are provided (see FIGURES 1b–4b). A generally rectangular frame 318 travels upwardly and downwardly between members 238 and 241, and between members 239 and 240. Each lift frame 318 includes a pair of transversely spaced vertical members 319 and 320 connected at their upper ends by members 321 and at their lower ends by rods 322. Rollers 323 mounted on shaft 324 fixed to the vertical frame members 238–241 at vertically spaced intervals guide the frames 318 in their vertical travel. Pivotally mounted on the rods 322 are the lift finger plates 325 which are adapted to engage under the projecting rims 35a on baskets 35, the plates 325 being normally biased to the inwardly disposed position in which they are shown in FIGURES 2b and 4b by gravity but being capable of being swung outwardly about rods 322 when they engage the rim of a basket placed under the baskets which were raised during the terminal portion of the downward stroke of the lift frames 318. Stop members 325a provided on plates 325 to engage the members 238–241 prevent the lift plates 325 from being moved too far outwardly during the descent of the lift frames 318.

A double-acting air cyclinder 326 (see FIGURE 1b) is provided to operate the lift frames 318, the cylinder 326 being pivotally connected as at 327 to a bracket 328 supported from top frame member 242 (see also FIGURE 3b). The piston rod 329 of cylinder 326 is pivotally connected as at 330 to an arm 331 which is fixed to a shaft 332 journaled by bearings 333 supported on the members 242 and 243. At opposite ends of the shaft, lift arms 334 are fixed thereto and are pivotally connected as at 335 to lift rods 336 which pivotally connect as at 337 to the lift frame top members 321, as shown in FIGURE 1b.

In operation, when a loaded basket 35 is received on roll assembly 247 it moves into engagement with a gate 338 (see FIGURE 5b) which is pivoted as at 339 and arranged to depress the actuator button of a limit switch switch 340, which starts motor 306 so that the pushers 287 traveling on chains 289 move the loaded basket 35 across the idler roll assembly 247 toward a dolly in position 39'. The switch 340 also operates to advance the piston rod 329 of double-acting cylinder 326 and raise the lift frames 318. With the lift plates 325 biased to inward position and engaged under the rim 35a of the lowermost basket 35, all baskets are lifted upwardly by the lift frames 318 to provide a space on the dolly at station 39' on which the loaded backet 35 being moved across by pusher fingers 287 may be received.

When a basket 35 is in position on a dolly at station 39', a limit switch 341 (see FIGURES 1b and 3b) having a depressible actuator arm 342 is actuated by a gate 343 pivoted at 344 and it is to be understood that the gate 343 is normally biased by a spring 345 to a raised position in which it will be engaged and depressed by a loaded basket 35 moving onto a dolly at station 39'. The container portions 230 of the dollies 39 are open in the middle, as shown in FIGURE 4b, at 346 to permit actuation of switch 341 in this manner. The switch 341 is responsible for retracting the piston rod 329 of cylinder 326 to lower the lift frames 318 to the position shown in diagrammatic lines in FIGURE 1b. During this lowering movement, the lift plates 325 are cammed outwardly when they engage the rim 35a of a basket 35 which has just been transferred over to the dolly at station 39' and then, when they have vertically cleared that rim 35a, move inwardly again to a position under that rim 35a, ready to lift the stack once again. In the meantime, the pushers 287 move through a complete cycle back to the original position illustrated at the left in FIGURE 1b by the diagrammatic lines.

The motor 281 is operated to move the pusher frame 261 and pushers 272 forwardly only when the desired stack height is reached for baskets on a dolly at station 39' and operates to move a replacement dolly under roll assembly 247 over to displace the dolly in position 39' A limit switch 347 which initiates operation of motor 281 (see FIGURE 1b) may be mounted on the rail 241 with a depressible button arranged to be depressed by a pivotal switch arm 348 pivotally mounted as at 349 and actuated when the lift frames 318 have moved the stack upwardly to place the last basket for that particular stack on the dolly underneath. The lift frames 318 are returned to "down" position before the pushers 272 traveling in the spaces 258 and 259 between the idler rolls (see FIGURE 5b) have operated to move a new dolly into the stacking station.

In the circuit (FIGURE 5) the motor 281 driving dolly replacing pushers 272 is in a circuit line s, with the contacts 350 of a suitable holding relay device 350a in circuit line $s_1$ which, once energized upon the making of switch 347, maintains motor 281 operative for a sufficient length of time to move the pusher frame 261 through both its forward and return strokes. Motor 281 is stopped on its return stroke when crank arm 277 engages a pivotal gate 350b and momentarilly depresses normally closed limit switch 350c to deenergize relay 350a. The advance solenoid 351 of cylinder 326 which operates lift frames 318 is in a circuit line t which also includes the normally open contacts 352 of a holding relay 352a in a circuit line w which are closed when the switch 340 is actuated and operate to raise the lift frames 318. The retract solenoid 353 of cylinder 326 is in the circuit line u with the normally open contacts 354 of a holding relay 354a in a circuit line x which are closed when switch 341 is depressed and operate to restore the lift frame 318 to lowered position. The motor 306 operating pusher fingers 287 is in a circuit line v with the contacts 355 of a holding relay 355a in a circuit line y which is also energized when the switch 341 is actuated and operates to energize the motor 306 for a sufficient period of time for the pushers 287 to move through a complete reciprocating cycle. Counterweighted brake device 311a on shaft 311 prevents rotation of the shaft 311 except in the driving direction.

Normally closed switch 356 (see FIGURE 1b) may be momentarily engaged by the pusher fingers 287 at the end of their forward travel to deenergize relay 352a. Also normally closed switch 357 (see FIGURE 2b) may be momentarily engaged by one of the lift plates 325 to deenergize relay 354a. Finally, a normally closed switch 358 (see FIGURE 7b) may be momentarily engaged by one of the links 288 to deenergize relay 355a.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In a bakery product handling system: a battery of processing machines such as bread packaging machines; traveling conveyor means, providing a plurality of product receiving stations thereon, extending along said battery of machines and receiving products from said machines at different locations along said conveyor means; electrical circuit means; transfer units for receiving products from said machines and delivering them to said conveyor means; separate motor means for operating each transfer unit intermittently operated by said circuit means; means for each transfer unit timed with the travel of said conveyor means independently of the other transfer units and connected in said circuit means to operate said transfer means motor means and deliver products to unoccupied stations only; means receiving said products from said conveyor means and disposed them in containers receiving a plurality of products; and means communicating with said latter means for vertically arranging said containers in tiers for transport.

2. The combination defined in claim 1 in which at least one standby machine is provided at the end of said battery; a standby transfer unit is provided for receiving products from said machine and delivering them to said conveyor means; and sensing means is provided upstream of said standby machine to sense an empty station on said conveyor means; said sensing means being connected in said circuit means and operating said standby transfer unit to fill said empty space.

3. The combination defined in claim 1 in which said means for vertically arranging said containers for transport includes lift frame means for lifting a container; and means for moving another container under the container lifted to form a stack.

4. The combination defined in claim 1 in which container conveyor means extends under said conveyor means and forwardly beyond said conveyor means; means is provided for moving containers on said container conveyor means in the same direction of travel as products on said conveyor means; means is provided for moving products on said conveyor means forwardly to move them off said conveyor means into said containers; and means is provided for operating said container moving means and product moving means in timed relation.

5. The combination defined in claim 4 in which said latter means comprises sensing means for sensing the presence of a product on said conveyor means connected in said circuit means to control the operation of said container moving means.

6. The combination defined in claim 5 in which second container conveyor means feeds containers to said container conveyor means at right angles thereto; and means is provided for operating said second container conveyor means under the control of said sensing means.

7. The combination defined in claim 4 in which said conveyor means includes an idler surface extension; and said means for moving said products on said conveyor means moves said products on said idler surface extension at an increased rate of speed relative to the speed of said conveyor means.

8. The combination defined in claim 6 in which both said container conveyor means comprise flights mounted on endless drive members.

9. The combination defined in claim 7 in which said means for moving products on said conveyor means includes endless means having an inclined run at the rear end of said extension with a horizontal component of travel of the same speed as said conveyor means; and a longitudinal run extending forwardly thereof in juxtaposed relation with said idler surface extension; and transversely extending sweep means connected at intervals on said endless means.

10. The combination defined in claim 1 in which said means for vertically arranging said containers includes a stacking station; means for transferring a support dolly to said stacking station; means for moving containers to said stacking station; and means connected in said circuit means for operating said dolly transferring means and means for moving said containers to said stacking station in controlled sequence.

11. The combination defined in claim 1 in which said means for vertically arranging said containers includes means for receiving containers; a stacking station; reciprocable means for transferring containers to said stacking station from said means for receiving containers; elevator means for elevating containers at said station immediately prior to the time a container is transferred thereto and for then lowering said elevator means to rest the elevated containers on the container transferred; and means connected in said circuit means for operating said reciprocable means and elevator means in sequence.

12. The combination defined in claim 1 in which said means for vertically arranging said containers comprises support surface means for receiving said containers; a stacking station; means for supporting said support surface means in an elevated position so that a support dolly for said containers is receivable thereunder; slot means in said support surface means; pusher means traveling in said slot means for transferring a support dolly from under said support surface means to said stacking station; and means for transferring containers from said support surface means to a dolly at said stacking station.

13. The combination defined in claim 1 in which a stacking station is provided; lift plate means is provided at said stacking station for raising containers at said station; means is provided for transferring containers to said station; and means is provided for operating said means for transferring containers to said station after said lift plate means has raised the containers at said station.

14. The combination defined in claim 1 in which said means for vertically arranging the containers includes a support surface on which containers are received; a stacking station; means connected in said electrical circuit means for moving containers from said support surface to the stacking station; means connected in said electrical circuit means for moving support dollies on which containers are to be stacked to said stacking station; lift means connected in said electrical circuit means for raising containers at said stacking station; and means operating said container moving means, dolly moving means and lift means in a sequence whereby a container on said dolly at the stacking station is raised by said lift means; a second container is moved to said stacking station by said container moving means beneath said raised container; said raised container is lowererd, and these operations are continued until a stack of desired height is achieved whence said dolly moving means is operated to move another dolly to said stacking station.

15. The combination defined in claim 1 in which a separate timing switch means correlated with the traveling conveyor means is connected in said circuit means to actuate the separate motor means operating each transfer unit at a time to load a different station on the traveling conveyor means.

16. The combination defined in claim 15 in which at least one standby machine is provided in said battery; a separate standby transfer unit driven by separate motive means is provided for transferring products from said standby machines to said traveling conveyor means; timing switch means correlated with the traveling conveyor means is connected in said circuit means to actuate the separate motive means operating said standby transfer unit to normally load each station; and sensing means preventing operation of said separate motive means except when a station passing said standby machine is unoccupied.

17. In a bakery product handling system: a battery of processing machines such as bread packaging machines; product conveyor means, providing a plurality of product receiving stations thereon, extending along said battery of machines and receiving products from said machines at different locations along said product conveyor means; electrical circuit means; transfer units for transferring products from said machines to said conveyor means; intermittently operative, separately disableable drive means for operating each transfer unit controlled by said circuit means; means for each transfer unit timed with the travel of said product conveyor means independently of the other transfer units and connected in said circuit means to enable said transfer means drive means and deliver products to unoccupied stations only; and means operated by said circuit means for transferring said products from said product conveyor means to containers receiving a plurality of products.

18. In a bakery product handling system: a battery of processing machines such as bread packaging machines; product conveyor means, providing a plurality of product receiving stations thereon, extending along said battery of machines and receiving products from said machines at different locations along said product conveyor means; each of said processing machines incorporating transfer units for transferring products from said processing machines to said conveyor means and incorporating means timed with the travel of said product conveyor means to deliver products to unoccupied stations only; there being a sufficient number of said processing machines to fill all said unoccupied stations when all said processing machines are normally operating; at least one normally inoperative standby processing machine provided at the end of said battery and incorporating a standby transfer unit for delivering products to said product conveyor means; and sensing means, provided upstream of said standby machine to sense an empty station on said conveyor means, and operating said standby transfer unit to fill said empty station; and means for transferring said products from said product conveyor means to containers receiving a plurality of products.

19. Apparatus for use in a bakery handling system comprising: elongate, continuously forwarding, traveling product conveyor means; a battery of processing machines such as bread packaging machines disposed along said product conveyor and delivering products at different locations to unoccupied stations thereon only; intermittently operating container conveyor means extending forwardly of and below said product conveyor means, and moving in the same direction as said product conveyor means to supply containers of greater length than the products, in which more than one row of products is to be received; means for transferring a row of products from said said product conveyor means to a container at a loading station adjacent a portion of said container conveyor; sensing means for sensing the presence of a row of products on said product conveyor means and operating said container conveyor means to move a container into position to receive a row of products from said product conveyor means; and control means for moving said container conveyor means a greater distance forwardly when an empty container is forwarded to said station to receive a first row of products than when a container is forwarded to receive a second row of products therein.

20. The combination of claim 19 in which said control means alternately move said container conveyor means a greater distance and a lesser distance.

21. The combination of claim 19 in which said container conveyor means extends in a converging path toward said product conveyor means and comprises endless member means with product engaging flight means connected thereto in spaced apart relation.

22. The combination defined in claim 19 in which said sensing means comprises electric eye elements and said container conveyor means includes a container support surface and flights for moving containers forwardly thereon.

23. The combination defined in claim 19 in which second container conveyor means extending perpendicularly to said first mentioned container conveyor means is intermittently operated to feed containers thereto; and common motive means is provided for driving said first mentioned container conveyor means and second container conveyor means in unison.

24. The combination defined in claim 19 in which said transfer means includes sweep mechanism traveling at a greater rate of speed than said product conveyor means to space out products thereon.

25. Apparatus for use in a bakery handling system comprising: means defining a stacking station; means for transferring product loaded containers to the stacking station; elevator means, incorporated with said means defining the stacking station, for raising containers at said station prior to the time a container is transferred thereto, and for then lowering the elevator means to rest the elevated containers on the container transferred; means for operating said elevator means in correlation with the transfer of containers to the stacking station; means for moving a support dolly for the containers to the stacking station; and means for operating said dolly moving means and container transferring means in controlled sequence so that said dolly moving means is operated only after a predetermined number of container transfers has been effected.

26. The combination defined in claim 25 in which said elevator means comprises vertically reciprocable frames with lift plate means rockable thereon to move past a container on the down stroke.

27. The combination defined in claim 25 in which support surface means is provided for receiving containers thereon; means supports said support surface means in elevated position so that a support dolly can be received thereunder; slot means are provided in said support surface means; and said dolly moving means comprises reciprocable pusher means traveling in said slot means.

28. Apparatus for use in a bakery handling system comprising: means defining a stacking station; support surface means provided for receiving product loaded containers thereon; means supporting said support surface means in elevated position so that a container support dolly can be received thereunder; slot means provided in said support surface means; dolly moving means comprising a reciprocable pusher means traveling in said slot means; means for transferring product loaded containers to the stacking station; elevator means for raising containers at said station prior to the time a container is transferred thereto, and for then lowering the elevator means to rest the elevated containers on the container transferred; and means for operating said elevator means in correlation with the transfer of containers to the stacking station.

References Cited
UNITED STATES PATENTS

| | | | |
|---|---|---|---|
| 2,899,784 | 8/1959 | Cleveland et al. | 53—61 |
| 2,907,152 | 15/1959 | Hensgen et al. | 53—74 X |
| 2,966,016 | 12/1960 | Meyers | 53—61 |
| 3,037,645 | 6/1962 | Simpkins | 214—6 |
| 3,053,025 | 9/1962 | Nigrelli et al. | 53—159 |
| 3,216,173 | 11/1965 | Anderson | 53—154 X |

TRAVIS S. McGEHEE, Primary Examiner

U.S. Cl. X.R.

53—61, 74, 154, 160; 214—6